W. A. Springer,
Bee Hive.

No. 109,557.  Patented Nov. 22. 1870.

Witnesses:
Alex F. Roberts
Frank Plockler

Inventor:
W. A. Springer
per [Attorneys]

United States Patent Office.

URIAH A. SPRINGER, PONTIAC, ILLINOIS.

Letters Patent No. 109,557, dated November 22, 1870.

IMPROVEMENT IN BEE-HIVES.

The Schedule referred to in these Letters Patent and making part of the same.

*To all whom it may concern:*

Be it known that I, URIAH A. SPRINGER, of Pontiac, in the county of Livingston and State of Illinois, have invented a new and useful Improvement in Bee-Hives; and I do hereby declare that the following is a full, clear, and exact description thereof, which will enable others skilled in the art to make and use the same, reference being had to the accompanying drawing forming part of this specification.

The object of this invention is to provide new and useful improvements in bee-hives, calculated for the better protection of the bees from the robber-bees.

Similar letters of reference indicate corresponding parts.

Figure 1:
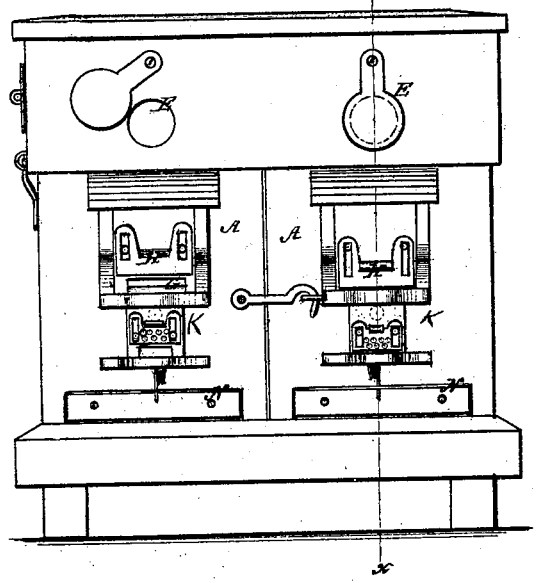
Figure 1 is a side elevation of a bee-hive embodying my improvement.
Figure 2:
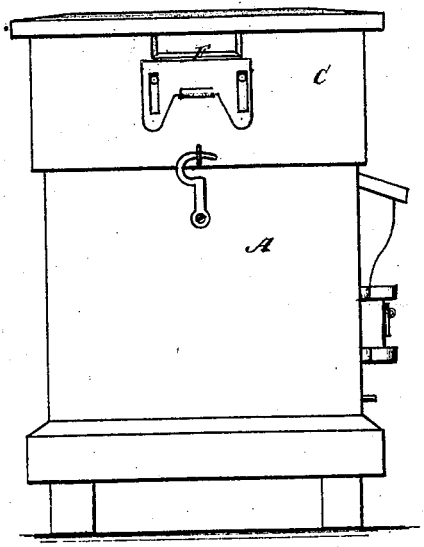
Figure 2 represents an end elevation.
Figure 3:
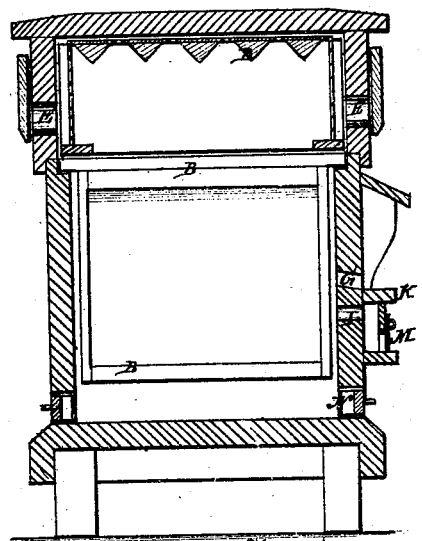
Figure 3 represents a sectional elevation, taken on the line $x\ x$ of fig. 1.
Figure 3:

A represents the body of the hive, which is provided with ventilators at the sides and ends, E and F.

The ventilating-passages E have hinged covers, and those at the ends have sliding gates. The latter are also protected by perforated plates.

The former is designed to admit light, and also to ventilate the hive, and the latter to ventilate the hive while excluding the light therefrom.

The ventilator E opens upon the glass side of the honey-box, thereby admitting light therein, and the ventilator F opens upon the wooden side of the honey-box, and thereby excludes the light therefrom.

G represents the main entrances to the hives, to be used in warm weather, and when no care is required to exclude robber-bees.

These passages are protected by sliding gates H, which, when closed, exclude the light from the hives. They are designed to be closed when the weather is cold, to confine the bees in the hives.

Below the passages aforesaid other passages are provided, wherein the hoods K are employed, in combination with perforated gates, for admitting atmospheric air for ventilation while excluding the light from the hive, because the light often causes the bees in mid-winter to leave the hive upon unusually warm or sunny days, whereupon they become chilled and are lost.

The perforated gates are opened to permit the bees to have free passage, except when endangered by robber-bees; they are then closed down, and the bees have access through the perforations, which are made of the proper size to admit the worker-bees only.

These passages also provide egress for the bees when the weather grows warmer, after being closed in on account of cold weather by the upper gates.

Having thus described my invention,

What I claim as new, and desire to secure by Letters Patent, is—

The combination and arrangement of the hood K, the aperture I, and the perforated plate M, substantially as shown and described.

URIAH A. SPRINGER.

Witnesses:
GEO. W. BAY,
ANDERSON GONGER.